United States Patent
Luo et al.

(10) Patent No.: US 9,452,483 B2
(45) Date of Patent: *Sep. 27, 2016

(54) ELECTRIC DISCHARGE MACHINING DIE SINKING DEVICE AND RELATED METHOD OF OPERATION

(71) Applicant: General Electric Company, Schenectady, NY (US)

(72) Inventors: Yuefeng Luo, Mechanicville, NY (US); William Edward Adis, Scotia, NY (US); Michael Lewis Jones, Scotia, NY (US)

(73) Assignee: General Electric Company, Schenectady, NY (US)

( * ) Notice: Subject to any disclaimer, the term of this patent is extended or adjusted under 35 U.S.C. 154(b) by 884 days.

This patent is subject to a terminal disclaimer.

(21) Appl. No.: 13/676,254

(22) Filed: Nov. 14, 2012

(65) Prior Publication Data

US 2014/0131318 A1 May 15, 2014

(51) Int. Cl.
*B23H 1/02* (2006.01)
*B23H 9/10* (2006.01)

(52) U.S. Cl.
CPC ............... *B23H 1/02* (2013.01); *B23H 1/024* (2013.01); *B23H 1/028* (2013.01); *B23H 9/10* (2013.01)

(58) Field of Classification Search
CPC .......... B23H 1/024; B23H 1/00; B23H 7/14; B23H 7/26; B23H 7/30
See application file for complete search history.

(56) References Cited

U.S. PATENT DOCUMENTS

| | | | | |
|---|---|---|---|---|
| 3,927,293 A | * | 12/1975 | Bell, Jr. | B23H 1/028 219/69.13 |
| 3,987,271 A | * | 10/1976 | Bell, Jr. | B23H 1/028 219/69.13 |
| 4,430,544 A | * | 2/1984 | Inoue | B23H 7/32 219/69.17 |
| 4,441,004 A | | 4/1984 | Inoue | |
| 5,023,421 A | * | 6/1991 | Bouchoud | B23H 11/00 200/61.42 |
| 6,831,246 B2 | | 12/2004 | Krenz | |
| 8,093,528 B2 | * | 1/2012 | Boccadoro | B23H 1/022 219/69.13 |
| 2005/0098445 A1 | * | 5/2005 | Batzinger | B23H 3/02 205/644 |
| 2010/0301017 A1 | | 12/2010 | Luo | |

FOREIGN PATENT DOCUMENTS

CN 201950314 * 8/2011 ............... B23H 7/02

* cited by examiner

*Primary Examiner* — Dana Ross
*Assistant Examiner* — Renee Larose
(74) *Attorney, Agent, or Firm* — Hoffman Warnick LLC; Ernest G. Cusick

(57) ABSTRACT

Systems and methods for controlled and precise EDM manufacturing of a component are disclosed. In one embodiment, a system includes: a tank for holding a fluid; a first electrode array in the tank, the first electrode array including a plurality of electrodes configured to shape a workpiece; a workpiece fixture for positioning the workpiece at least partially immersed in the fluid and proximate the first electrode array; a pulse generator for creating an electric discharge between the workpiece and the first electrode array to remove material from the workpiece; a gap sensing circuit communicatively connected to the workpiece and the first electrode array, the gap sensing circuit configured to monitor the electric discharge between the workpiece and the first electrode array; and a computing device communicatively connected to the gap sensing circuit and the workpiece fixture, the computing device manipulating a position of the workpiece in the tank relative the first electrode array based upon data obtained from the gap sensing circuit.

17 Claims, 13 Drawing Sheets

ELECTRIC DISCHARGE MACHINING DIE SINKING DEVICE AND RELATED METHOD OF OPERATION

BACKGROUND OF THE INVENTION

The invention relates generally to electric discharge machining (EDM) and, more particularly, to EDM die sinking devices with systems exhibiting higher metal removal rates and lower surface roughness than conventional EDM devices, and a related method of operation.

Traditional machining (e.g., 5 axis machining, computer numerical control (CNC) machining, etc.) of complex and/or large three dimensional components may be expensive, time-consuming, stress imparting, and imprecise. These methods may require that further finishing processes (e.g., hardening, bending, coating, etc.) be applied to machined components, and that tolerances be included in design considerations, thereby limiting component efficiency and complicating the manufacturing and design processes.

EDM die sinking has been used to make a variety of metal structures in small volumes. EDM die sinking typically involves placing a workpiece into a tank of fluid such as hydrocarbon-based oil. A die electrode having a mirror image of the desired shape for the workpiece is moved by a ram in close proximity to the workpiece, and an electric pulse is then repetitively applied to the gap between the die electrode and the workpiece to cause electric discharges that remove material from the workpiece. EDM die sinking has the capability of machining difficult metals or alloys without high cutting force and hard tools, which makes the process cost-efficient and less complex than conventional machining techniques. One possible application for EDM die sinking is in the manufacture of airfoil shapes on turbine blades, which are made of heat resistant, nickel-based alloys that withstand the ever-increasing temperatures of steam turbines. These tough alloys present considerable difficulties in part production because the intricate shapes required are difficult to machine, which, as discussed above, drives the cost of equipment and operation higher. However, during EDM die sinking, low material removal rates may be experienced, electrodes may wear resulting in nonlinear shaping, and the EDM die sinking process may require rotation and/or reorientation of the component during processing.

BRIEF DESCRIPTION OF THE INVENTION

Systems and methods for controlled and precise EDM manufacturing of a component are disclosed. In one embodiment, a system includes: a tank for holding a fluid; a first electrode array in the tank, the first electrode array including a plurality of electrodes configured to shape a workpiece; a workpiece fixture for positioning the workpiece at least partially immersed in the fluid and proximate the first electrode array; a pulse generator for creating an electric discharge between the workpiece and the first electrode array to remove material from the workpiece; a gap sensing circuit communicatively connected to the workpiece and the first electrode array, the gap sensing circuit configured to monitor the electric discharge between the workpiece and the first electrode array; and a computing device communicatively connected to the gap sensing circuit and the workpiece fixture, the computing device manipulating a position of the workpiece in the tank relative the first electrode array based upon data obtained from the gap sensing circuit.

A first aspect of the invention provides an electric discharge machining (EDM) die sinking device including: a tank for holding a fluid; a first electrode array in the tank, the first electrode array including a plurality of electrodes configured to shape a workpiece; a workpiece fixture for positioning the workpiece at least partially immersed in the fluid and proximate the first electrode array; a pulse generator for creating an electric discharge between the workpiece and the first electrode array to remove material from the workpiece; a gap sensing circuit communicatively connected to the workpiece and the first electrode array, the gap sensing circuit configured to monitor the electric discharge between the workpiece and the first electrode array; and a computing device communicatively connected to the gap sensing circuit and the workpiece fixture, the computing device manipulating a position of the workpiece in the tank relative the first electrode array based upon data obtained from the gap sensing circuit.

A second aspect of the invention provides an electric discharge machining (EDM) die sinking device including: a first electrode array including a plurality of electrode segments, the first electrode array including a first shape for imparting to a workpiece; a separate electric pulse generator coupled to each electrode segment of the first electrode array; a pulse controller coupled to each separate electric pulse generator for generating an electric discharge on each electrode segment independently of other electrode segments to remove material from the workpiece; and a gap sensing circuit communicatively connected to the first electrode array and configured to monitor an inter-electrode gap between the first electrode array and the workpiece.

A third aspect of the invention provides a gap sensing circuit including: a voltage divider communicatively connected to a first electrode array and configured to monitor an inter-electrode gap between the first electrode array and a workpiece; and a voltage integrator communicatively connected to the voltage divider and a reference voltage, the voltage integrator configured to compare data obtained from the first electrode array with the reference voltage to determine a feed rate of the workpiece.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure are not necessarily to scale. The drawings are intended to depict only typical aspects of the disclosure, and therefore should not be considered as limiting the scope of the disclosure. It is understood that elements similarly numbered between the FIGURES may be substantially similar as described with reference to one another. Further, in embodiments shown and described with reference to FIGS. 1-13, like numbering may represent like elements. Redundant explanation of these elements has been omitted for clarity. Finally, it is understood that the components of FIGS. 1-13 and their accompanying descriptions may be applied to any embodiment described herein.

DETAILED DESCRIPTION OF THE INVENTION

As indicated above, aspects of the invention provide for systems and methods for improving precision, efficiency, and control of EDM processes. During operation/processing, a workpiece may be placed into a tank of the system which contains a fluid. A workpiece holder may lower the workpiece into the fluid, positioning the workpiece at least partially within the fluid proximate a set of electrodes. The set of electrodes may be configured to form a specific shape and may be connected to a set of pulse generators. As the workpiece is processed, the set of pulse generators may create a series of electric discharges between the workpiece and the set of electrodes, thereby removing material from the workpiece in a controlled manner and forming a desired component from the workpiece. The set of electrodes may be controlled by a computing device which adjusts a position, frequency, and/or duration of discharge for each electrode in the set of electrodes. In an embodiment, the computing device may monitor discharges between the workpiece and set of electrodes and adjust operation accordingly.

Figure 1:
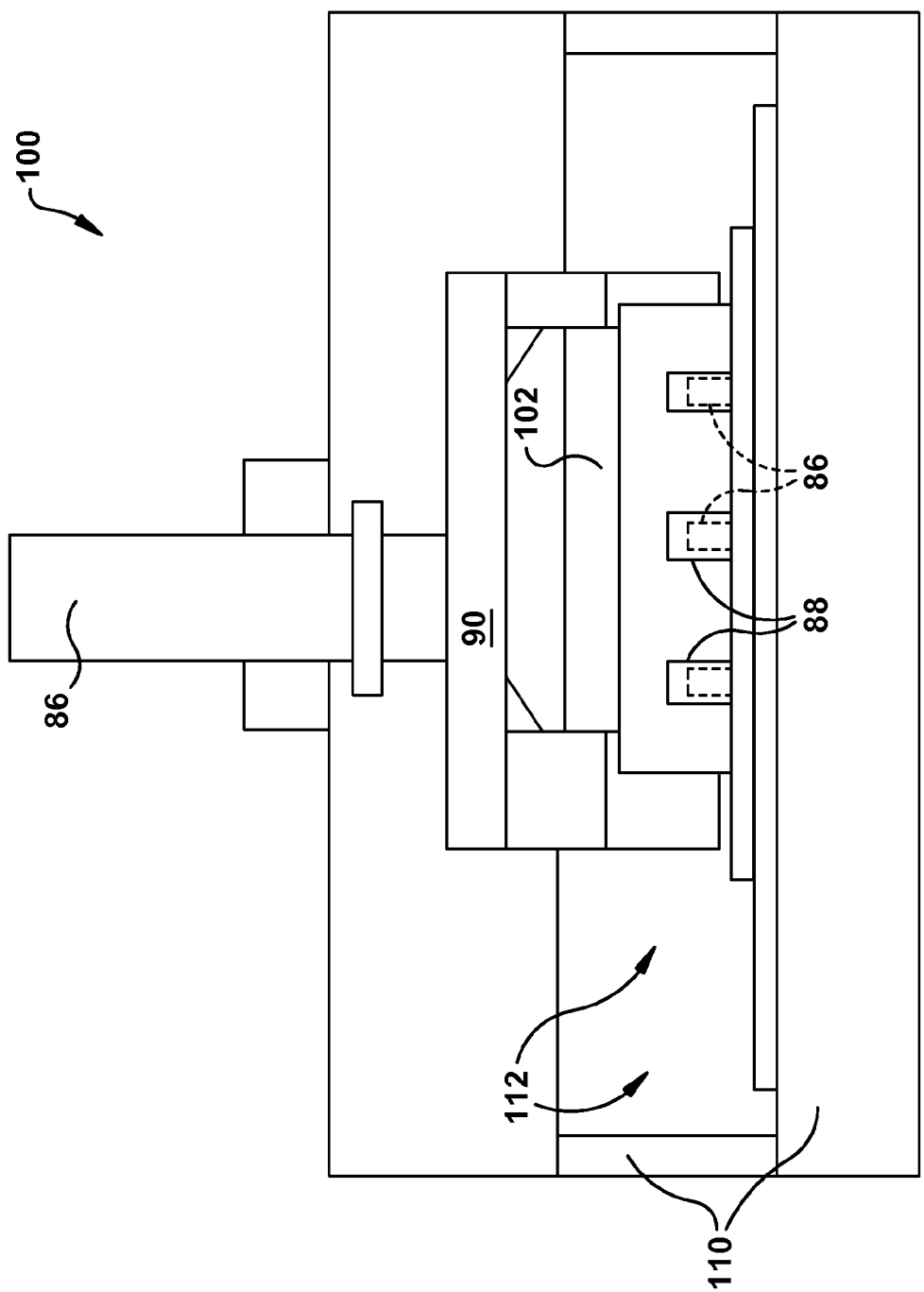
FIG. 1 shows a schematic view of a portion of an electric discharge machining (EDM) die sinking device in accordance with an embodiment of the invention.

Turning to the FIGURES, embodiments of systems, devices, and methods are shown, which are configured to improve component processing and quality. Each of the components in the FIGURES may be connected via conventional means, e.g., via a common conduit, terminals, or other known means as is indicated in FIGS. 1-13. Specifically, referring to FIG. 1, a portion of an electric discharge machining (EDM) die sinking device 100 is shown according to embodiments. EDM die sinking device 100 applies an electric discharge to a workpiece 102 by one or more electrodes in an electrode set 86 (shown in phantom) which is strengthened by the back ribs 88 to remove material from the workpiece. Workpiece 102 is positioned proximate electrode set 86 and held in place by a workpiece fixture 90. Electrode set 86 and workpiece 102 are made of conductive material. Workpiece 102 may be made of any conductive material, but EDM die sinking device 100 is especially applicable to harder materials such as heat resistant, nickel-based alloys such as Inconel, which are difficult to machine using conventional machining. As shown in FIG. 1, in one embodiment, EDM die sinking device 100 includes a tank 110 for holding a fluid 112. Fluid 112 may include hydrocarbon-based oil, or other dielectric liquid, used to, among other things, maintain media insulation before each electrical discharge, capture particles removed from workpiece 102, and disperse heat.

Figure 2:
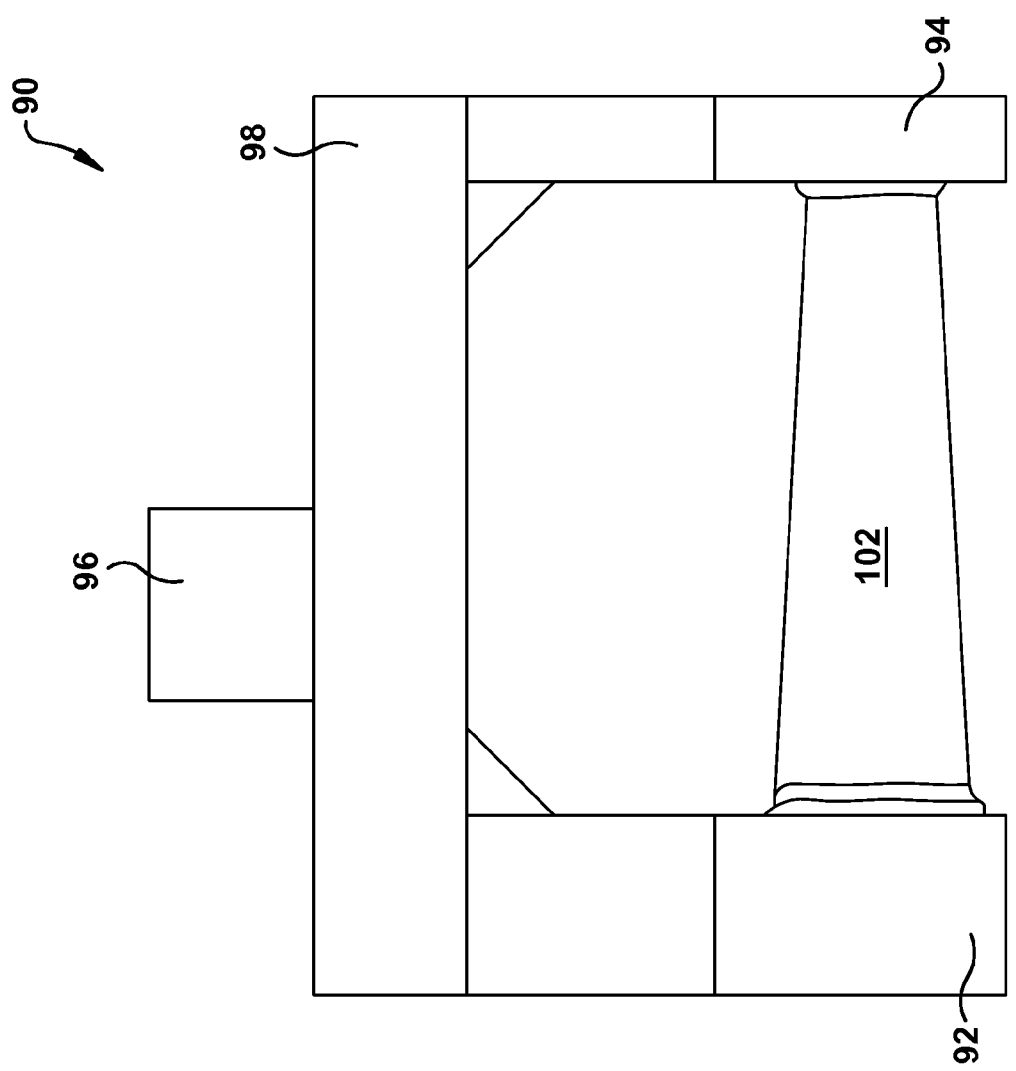
FIG. 2 shows a schematic view of a portion of an EDM die sinking device in accordance with an embodiment of the invention.

Turning to FIG. 2, a portion of workpiece fixture 90 is shown according to embodiments. Workpiece fixture 90 may connect to workpiece 102 via a set of flanges 92 and 94. In an embodiment, set of flanges 92 and 94 may contact workpiece 102 at distal ends, thereby increasing surface area exposure and shaping of workpiece 102. Flanges 92 and 94 may be connected to a support bar 98 which is configured to connect to a control rod 96. Control rod 96 may manipulate workpiece fixture 90 and/or workpiece 102, thereby adjusting, locating, moving, and positioning workpiece 102 about EDM die sinking device 100.

In one embodiment, workpiece fixture 90 positions workpiece 102 at least partially immersed in fluid 112 (shown in FIG. 1). Workpiece fixture 90 may include any structure capable of holding workpiece 102 in the appropriate orientation for use in EDM die sinking device 100 (e.g., a hydraulically or electrically driven ram). This arrangement with workpiece 102 on a movable workpiece fixture 90 and electrode(s) in tank 110 represents a departure from conventional EDM die sinking techniques, which immovably place the workpiece in the tank and move a single electrode into proximity to the workpiece. The current arrangement allows for use of more than one electrode and results in faster machining from multiple sides of the workpiece. In the example shown, workpiece 102 is to be shaped into a turbine bucket or nozzle, and as such, workpiece fixture 90 must be able to support workpiece 102 in a cantilevered fashion for application to electrode(s).

Figure 3:
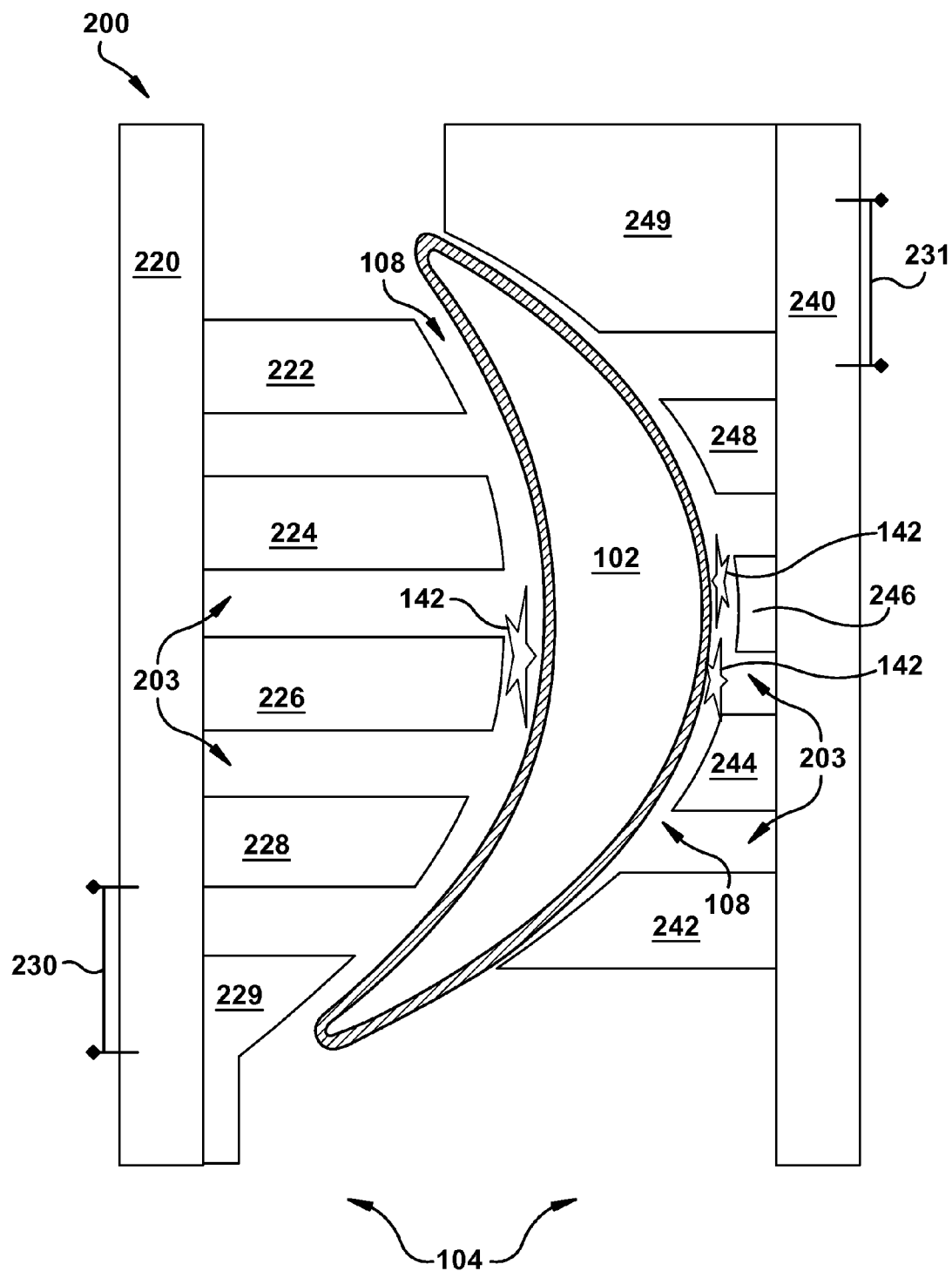
FIG. 3 shows a schematic view of a portion of an EDM die sinking device in accordance with an embodiment of the invention.

As shown in FIG. 3, workpiece 102 may be positioned in a first electrode array 104 between a first set of electrodes 222, 224, 226, 228, and 229, and a second set of electrodes 242, 244, 246, 248, and 249. First set of electrodes 222, 224, 226, 228, and 229, may be connected to a first pulse generator 230, and second set of electrodes 242, 244, 246, 248, and 249, may be connected to a second pulse generator 231. During operation, first pulse generator 230 may create a set of electric discharges 142 between workpiece 102 and first set of electrodes 222, 224, 226, 228, and 229, and second pulse generator 231 may create set of electric discharges 142 between workpiece 102 and second set of electrodes 242, 244, 246, 248, and 249, to remove material from workpiece 102. Pulse generators 230 and 231 may include any now known or later developed mechanism for causing electric discharge 142 between first electrode array 104 and workpiece 102 sufficient to cause removal of material from workpiece 102. As is known in the art, electric discharge 142 may move along the space between first set of electrodes 222, 224, 226, 228, and 229, and second set of electrodes 242, 244, 246, 248, and 249 to remove material from a surface of workpiece 102 where the space there between is sufficiently small to sustain electric discharge 142. In contrast to conventional EDM, pulse generators 230 and 231 may cause first set of electrodes 222, 224, 226, 228, and 229, and second set of electrodes 242, 244, 246, 248, and 249 to have a positive polarity and workpiece fixture 90 to have a negative polarity. Pulse generators 230 and 231 may be connected with a workpiece fixture controller 132 which may provide voltage feedback as a discharge signal to workpiece holder controller 132 for purposes described herein.

Figure 4:
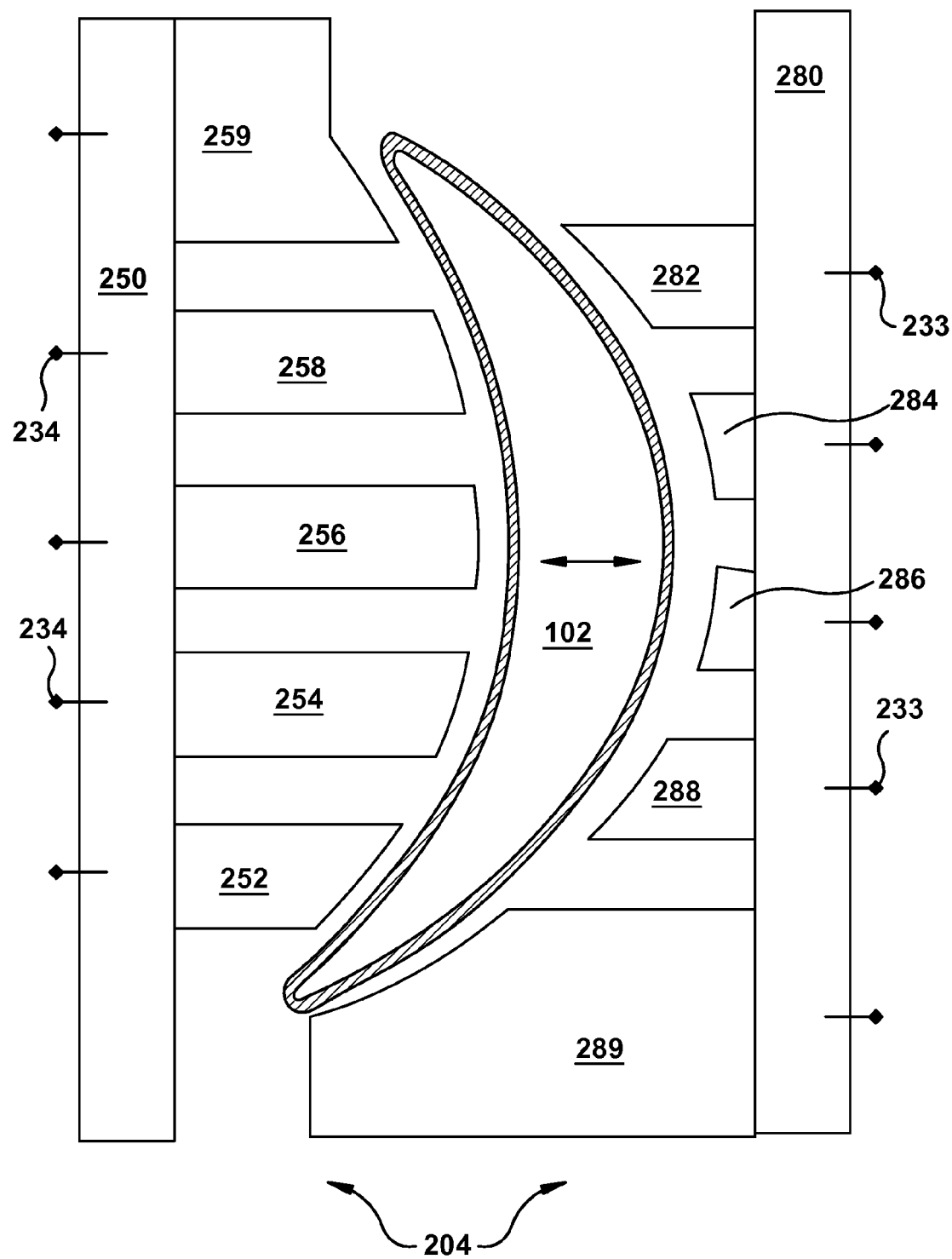
FIG. 4 shows a schematic view of a portion of an EDM die sinking device in accordance with an embodiment of the invention.

In an embodiment, EDM device 100 may include a second electrode array 106 (shown in FIG. 4). As can be seen in FIG. 4, workpiece 102 may be positioned in second electrode array 106 between a third set of electrodes 252, 254, 256, 258, and 259, and a fourth set of electrodes 282, 284, 286, 288, and 289. Third set of electrodes 252, 254, 256, 258, and 259, may be connected to a third pulse generator 234, and fourth set of electrodes 282, 284, 286, 288, and 289, may be connected to a fourth pulse generator 233. During operation, third pulse generator 234 may create set of electric discharges 142 between workpiece 102 and third set of electrodes 252, 254, 256, 258, and 259, and fourth pulse generator 233 may create set of electric discharges 142 between workpiece 102 and fourth set of electrodes 282, 284, 286, 288, and 289, to remove material from workpiece 102. Pulse generators 233 and 234 may include any now known or later developed mechanism for causing electric discharge 142 between second electrode array 106 and workpiece 102 sufficient to cause removal of material from workpiece 102. As is known in the art, electric discharge 142 may move along the space between third set of electrodes 252, 254, 256, 258, and 259, and fourth set of electrodes 282, 284, 286, 288, and 289, to remove material from a surface of workpiece 102 where the space there between is sufficiently small to sustain electric discharge 142. In contrast to conventional EDM, pulse generators 233 and 234 may cause third set of electrodes 252, 254, 256, 258, and 259, and fourth set of electrodes 282, 284, 286, 288, and 289, to have a positive polarity and workpiece fixture 90 to have a negative polarity. Pulse generators 233 and 234 may be connected with a workpiece fixture controller 132 and may provide voltage feedback as a discharge signal to workpiece holder controller 132 for purposes described herein. It is understood that any number, orientation, and/or combination of electrode and electrode arrays may be used in accordance with embodiments of the invention, and that the embodiments described herein are merely exemplary.

In one embodiment, where two electrode arrays 104 and 106 are provided, workpiece fixture 90 (shown in FIG. 2), may via workpiece holder controller 132, alternately move workpiece 102 between first electrode array 104 (shown in FIG. 3) at which electric discharge machining occurs on workpiece 102 in a first pattern as defined by first set of electrodes 222, 224, 226, 228, and 229, and second set of electrodes 242, 244, 246, 248, and 249), and second electrode array 106 where electric discharge machining occurs on workpiece 102 in a pattern complementary to the processing of first electrode array 104 (e.g., as defined by third set of electrodes 252, 254, 256, 258, and 259, and fourth set of electrodes 282, 284, 286, 288, and 289). The alternating movement continues until workpiece 102 reaches the dimensional destination/shape mandated by component design. Consequently, workpiece 102 can be shaped into an airfoil by the alternating movement of the workpiece between the two complementary electrode arrays 104, 106, and orchestrated electric discharges created by pulse generators 230, 231, 233, and 234. In one embodiment, workpiece 102 may be held stationary within tank 110, while first and second electrode arrays 104 and 106 may be manipulated/alternated about workpiece 102 for processing. In one embodiment, in contrast to conventional EDM, pulse generators 230 and/or 231 cause tank 110 to have a positive polarity, and workpiece fixture 90 to have a negative polarity.

Although not necessary, as illustrated, first electrode array 104 and second electrode array 106 may be configured to complement (e.g., form an uninterrupted surface) on workpiece 102. In the example shown, first electrode array 104 and second electrode array 106 are configured to form an airfoil shape for a blade or nozzle for a turbine. In this manner, workpiece 102 can be shaped into practically any shape, simple or complex, using EDM die sinking device 100. It is understood, however, that one, two, or more than two electrode arrays 104, 106 all may be used depending on the structure to be manufactured. For example, in some cases, where the manufactured component only requires machining in one area, only one electrode may be used. Similarly, where the manufactured part includes surfaces with identical features (e.g., is symmetrical), one electrode may be employed to machine each surface with workpiece fixture 90 providing sufficient workpiece 102 manipulation to accommodate machining of the requisite areas. Similarly, where more complex manufactured components are required, any number of electrodes with different shapes may be employed and workpiece fixture 90 configured to move between them within one or more tanks 110.

As shown in FIGS. 1, 3, and 4, EDM creates a particle containing fluid 112 (e.g., dielectric oil) (shown within arrows) including particles of workpiece 102 suspended therein. One challenge related to increasing the speed of machining using conventional EDM die sinking is removing the particles from near workpiece 102. In the embodiment illustrated, a space 108 between workpiece 102 and electrode array 104 or 106 contains particle containing fluid 112, which has a high temperature. Since the interface between workpiece 102 and electrode arrays 104 or 106 is situated vertically, the hot fluid 112 naturally flows upwards and carries some particles out of the space (e.g., by convection). Electrode arrays 104 and 106 further define a set of channels 203 between first set of electrodes 222, 224, 226, 228, and 229, and second set of electrodes 242, 244, 246, 248, and 249, which may further draw particles and fluid 112 from workpiece 102. Additionally, EDM die sinking device 100 through movement of workpiece 102 and/or electrode arrays 104 and 106, shown in FIGS. 3 and 4, causes the particle containing fluid 112 to be at least partially drawn out of channels 203 and space 108. That is, movement of workpiece 102 via workpiece fixture 90 and/or electrode array 104 and 106, causes a fluid evacuation (e.g., fluid pressure gradient, a low pressure area, a pumping effect, etc.) in space 108 and/or channels 203 which is sufficient to flush particle containing fluid 112 from space 108 and/or channels 203, and replace it with cleaner fluid 112. Consequently, each time workpiece 102 and/or electrode arrays 104 and 106 are alternately moved, cleaner fluid 112 is introduced within space 108 and channels 203 between electrode arrays 104, 106 and workpiece 102, which allows for faster and better machining.

In an embodiment, fluid 112 may act as an insulator between any of first set of electrodes 222, 224, 226, 228, and 229, and second set of electrodes 242, 244, 246, 248, and 249. As shown in FIGS. 3 and 4, first set of electrodes 222, 224, 226, 228, and 229, and second set of electrodes 242, 244, 246, 248, and 249, may be employed in this case to ensure complete machining of a surface. That is, first set of electrodes 222, 224, 226, 228, and 229, in FIG. 3 machine a given set of locations, and third set of electrodes 252, 254, 256, 258, and 259, in FIG. 4 machine another given set of locations created by the space between first set of electrodes 222, 224, 226, 228, and 229, of FIG. 3 such that an entire surface is machined. Otherwise, EDM die sinking device 100 operates substantially as described above.

Figure 5:
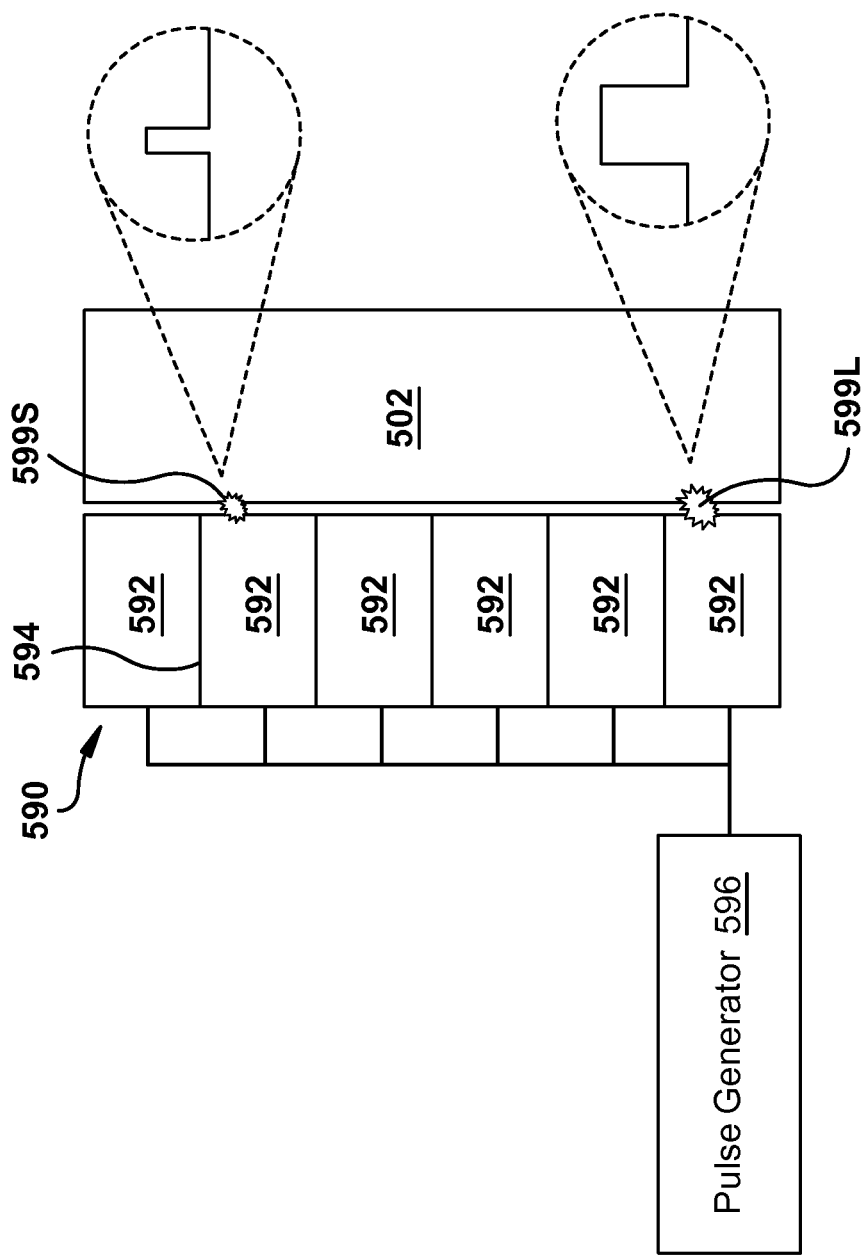
FIG. 5 shows a schematic view of a portion of an EDM die sinking device in accordance with an embodiment of the invention.

Turning to FIG. 5, other challenges for conventional EDM die sinking machining relative to use for precision manufactured parts and mass production is that it either has too low of a metal removal rate (MRR) or it creates insufficiently uniform machining due to large discharge craters or a rough surface. FIG. 5 illustrates the challenge relative to a conventional multiple segment electrode 590. As known in the art, a multiple segmented electrode 590 includes a number of electrode segments 592, each separated by an insulation layer 594 there between (only one labeled for clarity). As illustrated, a single pulse generator 596 is coupled to all of the multiple electrode segments 592 to deliver a single voltage pulse, which after an ignition delay or gap stressing, typically creates an electric discharge 599L that may grow in size. During this single discharge pulse, other smaller electrical discharges 599S on other segments may not occur due to the lowered voltage between electrodes 592 and workpiece 502 by the discharge 599L. Other electrical discharges 599S of very low probability may ignite at a later time than the initial discharge 599L with substantially lower current, which results in shortened discharge duration and a smaller removal amount. After a certain pulse duration, the pulse is turned off to control the discharge energy and de-ionize the gap between the electrode and workpiece for the next round of discharging. Electric discharges 599L, 599S are not typically equal in strength (current) and discharge duration. More specifically, the strength of the electric discharge and the duration is reliant on the spacing between electrode segments 592 and workpiece 102 and local particle density/temperature, which may vary along the surfaces of the workpiece and the electrode. Electric discharge 599L is relatively strong and long in duration (as shown by graph s 'J' to the right of the discharge) and results in a large metal removal rate and a poor surface quality with large craters. In contrast, another electric discharge 599S may be relatively weak and short in duration (as shown by graph 'K' to the right of the discharge) and may result in a low to negligible (e.g., non-existent) metal removal rate. Further, shorter electric discharges 599S tend to wear the electrode. Consequently, the machining can be very uneven and result in pitting in one location and under-machining in another. This situation is inoperative for parts where precision is required, and may be especially profound where curved surfaces are created. The probability of multiple uniform electrical discharges is very low because the different locations and oil situations prohibit discharge uniformity with a single pulse source. As a result, in order to achieve high material removal rate, a single large discharge has to be applied rather than multiple small discharges. This may result in surface roughness due to the large discharge. Thus, the original purpose of multiple pulse electrodes is not realized even with the multiple electrode segments.

Figure 6:
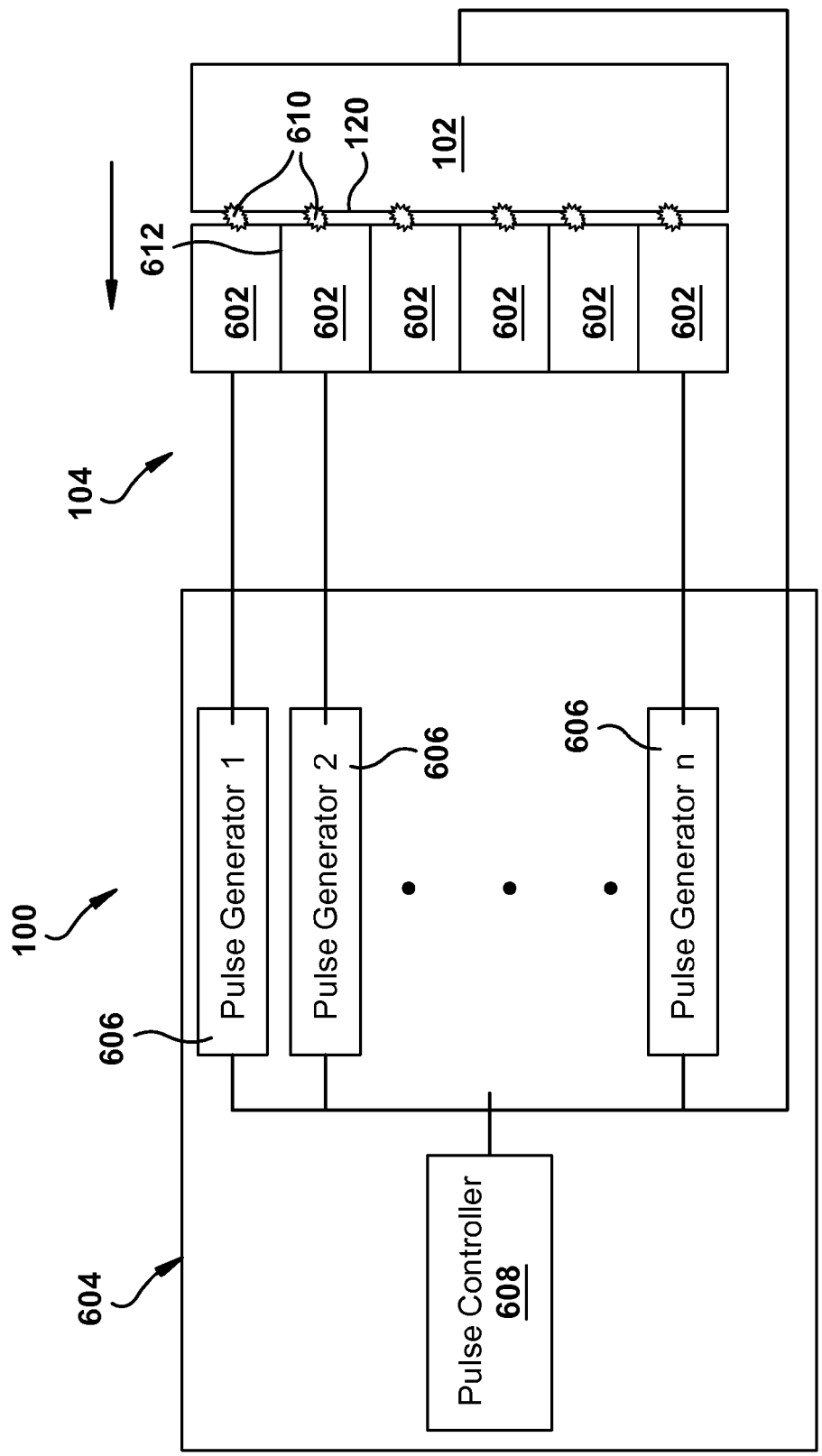
FIG. 6 shows a schematic view of a portion of an EDM die sinking device in accordance with an embodiment of the invention.
Figure 7:
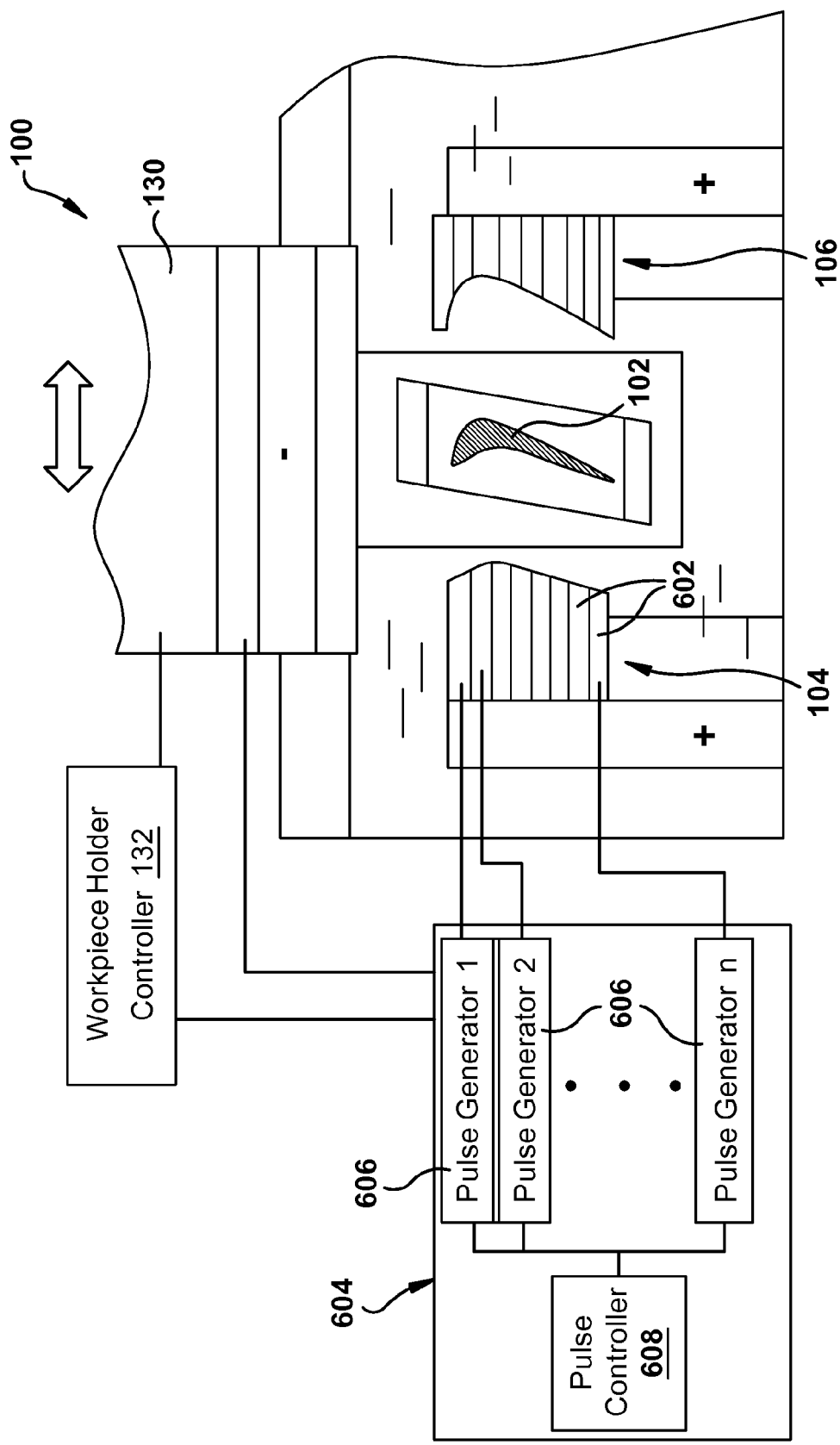
FIG. 7 shows a schematic view of a portion of an EDM die sinking device in accordance with an embodiment of the invention.

Referring to FIGS. 6 and 7, electrode arrays 104 and/or 106 of EDM die sinking device 100 may include a plurality of electrode segments 602. As with electrode arrays 104 and 106, electrode segments 602 may include a shape (here planar) for imparting to workpiece 102. In contrast to conventional EDM die sinking devices, however, pulse generator 604 includes a separate electric pulse generator 606 coupled to each electrode segment 602 of the electrode array. Each electrode segment 602 may be electrically insulated from an adjacent segment by an insulator 612 (e.g., a polymer layer, a fluid space, etc.). In addition, a pulse controller 608 commanding the same discharge duration and current is coupled to each separate electric pulse generator 606. Each pulse generator 606 may include an independent oscillator for generating an electric discharge 610 with the same discharge energy on each electrode segment 602, independent of other electrode segments 602, to remove material from workpiece 102. In one embodiment, pulse controller 608 commands the same discharge duration, discharge current, and pulse interval to all pulse generators 606 according to the specified metal removal rate and surface roughness. Each pulse generator 606 launches a voltage pulse at the same voltage amplitude and waits for a local fluid (oil) breakdown, which takes place at different times. Upon the local breakdown, each pulse generator 606 starts to count down the discharge duration instructed by pulse controller 608, i.e., via a counter (not shown). The same discharge current instructed by pulse controller 608 is maintained electronically. As soon as the specified discharge expires, each pulse generator 606 stops the voltage pulse, resulting in identical pulse durations for all electrode segments as instructed by pulse controller 608. The counter within each pulse generator 606 may also maintain the instructed pulse interval. Because local breakdowns depend on different local gap status (e.g., different particle density, gap size, and temperature) and ignite randomly at different times, each independent pulse generator 606 is dedicated to the special local situation of its respective electrode segment 602 to achieve uniform electric discharge. These independent pulse generators 606 may not communicate with one another, but adapt to their own local gap situations separately corresponding to the particular electrode segments 602. In FIG. 7, electrical discharges 210 discharge independently (e.g., at different times, at different power, etc.). The same pulse interval may be given at different time instances for different segments 602. However, the system maintains the same discharge energy, namely the same discharge duration and current. That is, while there are as many electrical discharges as there are electrode segments, the discharges last the same duration, but start and stop at different times. The independent and dedicated pulse generators 606 make these uniform but unsynchronized discharges possible. Since segments 602 can be provided with an identical discharge duration/current to have each electric discharge 610 made substantially identical in strength and duration to other electrical discharges, machining results may be enhanced from MRR methods, and an improved surface quality with uniform craters produced. Furthermore, a life cycle of electrode arrays 104 and 106 can be better controlled. It is understood that the orientation, placement, and/or configuration of the components described with reference to embodiments herein is merely exemplary and that any orientation, placement, and/or configuration, including a vertical configuration may be included in embodiments of the invention.

Electrode arrays 104 and/or 106 may be used with any EDM die sinking machine including, as shown in FIG. 7, EDM die sinking device 100 of FIGS. 1-4. In this case, first electrode array 104 and second electrode array 106 may each include a plurality of electrode segments 602 configured as illustrated in FIG. 7.

Operation of EDM die sinking device 100 with electrode arrays 104 and 106 will now be described. Workpiece holder controller 132 controls movement of workpiece fixture 90, and hence, workpiece 102. Under machine computer numeric control (CNC), workpiece holder controller 132 drives workpiece 102 into a position in tank 110 and between electrode arrays 104 and 106. During the EDM process, workpiece holder controller 132 detects a (gap) voltage between workpiece 102 and electrode arrays 104 and/or 106 (and each segment 602, if provided), and controls the feeding speed of workpiece 102 towards electrode arrays 104 and/or 106 based on the detected voltage. High gap voltage leads to high feeding speed while low gap voltage leads to low feeding speed or even workpiece withdrawal to escape shorting or arcing. Workpiece holder controller 132 may reduce workpiece 102 feeding, or distance workpiece 102 from the electrode array 104 and/or 106 in response to an electric discharge from one of the plurality of electrode segments 602 having a gap voltage lower than a threshold. This situation indicates that shorting or arcing may be occurring at a given location. The threshold may be set to, for example, a given gap voltage that represents a gap status of such a magnitude as to cause pitting or other forms of potential damage. Similarly, workpiece holder controller 132 may increase the feeding speed of workpiece 102 towards electrode array 104 and/or 106 in response to none of the plurality of electrode segments 602 discharging to the workpiece. This situation occurs where electrode segments 602 have each machined sufficient material off of workpiece 102 such that the spacing between electrode array 104 and/or 106, and workpiece 102 is too distant for further gap breakdowns. Furthermore, workpiece holder controller 132 maintains the feeding speed of workpiece 102 toward electrode array 104 and/or 106 in response to all of the plurality of electrode segments 602 discharging to the workpiece at an expected discharge voltage level. This situation occurs where electrode segments 602 are each machining at equal increments such that the spacing between electrode arrays 104 and 106, and workpiece 102 is sufficient for further even machining. This is most often the case near the finishing of machining, where workpiece 102 has substantially taken on the desired shape. Alternatively, if one or several electrode segments 602 discharge to workpiece 102 at an expected discharge voltage level, the feeding speed is also maintained. This may occur when some projecting portion of the curved electrode surface engages workpiece 102 before other electrode segment(s) 602 of the electrode engage, these portions having too large of a space for breakdown and discharging.

Figure 8:
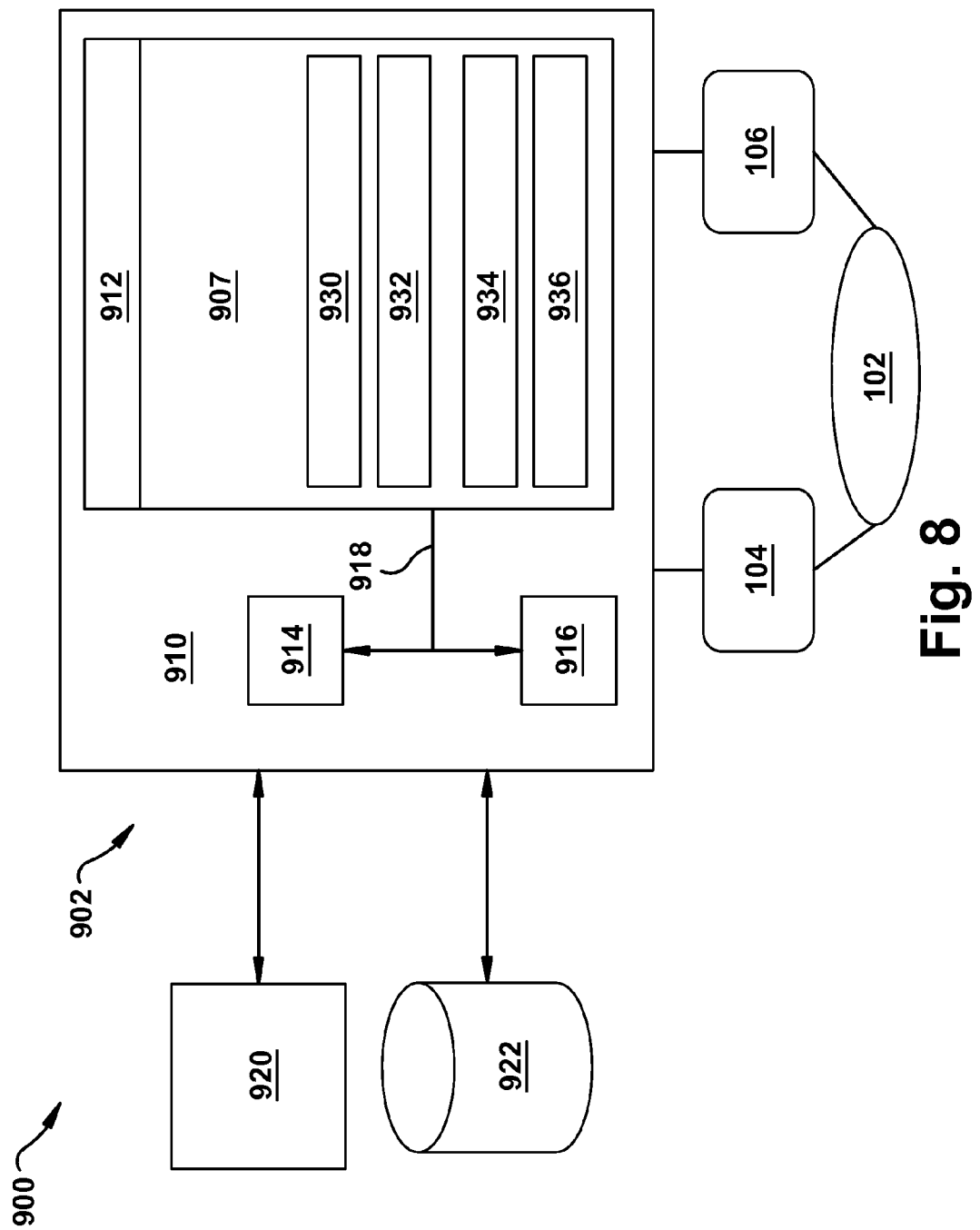
FIG. 8 shows a schematic view of a portion of an EDM die sinking device in accordance with an embodiment of the invention.

Turning to FIG. 8, an illustrative environment 900 including an EDM device control system 907 is shown according to embodiments of the invention. Environment 900 includes a computer infrastructure 902 that can perform the various processes described herein. In particular, computer infrastructure 902 is shown including computing device 910 which includes EDM device control system 907, which enables computing device 910 to analyze operation of an EDM device 100 by performing the process steps of the disclosure. In one embodiment, computing device 910 may determine efficiency and/or set of gaps between electrode segments 602, electrode arrays 104 and 106, and workpiece 102.

In one embodiment, computing device 910 and/or EDM device control system 907 may monitor a series of electrical pulses between electrode segments 602, electrode arrays 104 and 106, and/or workpiece 102 for analysis of the EDM process. The monitoring of these pulses generating a statistical model of the EDM process. In one embodiment, a plurality of pulses may be monitored from each electrode and/or channel to find/determine which is the most active electrode/channel (e.g., the electrode and/or channel with the highest percentage of interacting pulses or active pulses that trigger a spark or a shorting current). Once computing device 910 and/or EDM device control system 907 makes this determination, the gap sensing circuit may follow the gap voltage of this electrode/channel until a new more active channel (e.g., a channel with a gap size that is the smallest at the found electrode) is found by computing device 910 and/or EDM device control system 907. During operation other channels may sporadically/periodically give a lowest voltage reading due to random particles passing through the gap with the workpiece, but these isolated incidents may be detected and identified by computing device 910 and/or EDM device control system 907 as not the electrode with the smallest gap. In one embodiment, the gap sensing circuit monitors the most active gap and ignores any lower voltages detected in other channels, as these low voltages from larger gaps may just be caused by short-lived random particles or bridges. Thus, the gap sensing circuit and/or algorithm may lead to a more stable feed rate and a higher efficiency.

As previously mentioned and discussed further below, EDM device control system 907 has the technical effect of enabling computing device 910 to perform, among other things, the EDM process analysis and control features described herein. It is understood that some of the various components shown in FIG. 8 can be implemented independently, combined, and/or stored in memory for one or more separate computing devices that are included in computing device 910. Further, it is understood that some of the components and/or functionality may not be implemented, or additional schemas and/or functionality may be included as part of EDM device control system 907.

Computing device 910 is shown including a memory 912, a processor unit (PU) 914, an input/output (I/O) interface 916, and a bus 918. Further, computing device 910 is shown in communication with an external I/O device/resource 920 and a storage system 922. As is known in the art, in general, PU 914 executes computer program code, such as EDM device control system 907, that is stored in memory 912 and/or storage system 922. While executing computer program code, PU 914 can read and/or write data, such as graphical user interface 930 and/or operational data 934, to/from memory 912, storage system 922, and/or I/O interface 916. Bus 918 provides a communications link between each of the components in computing device 910. I/O device 920 can comprise any device that enables a user to interact with computing device 910 or any device that enables computing device 910 to communicate with one or more other computing devices. Input/output devices (including but not limited to keyboards, displays, pointing devices, etc.) can be coupled to the system either directly or through intervening I/O controllers.

In some embodiments, as shown in FIG. 8, environment 900 may optionally include first electrode array 104 and second electrode array 106 communicatively connected to workpiece 102 and computing device 910 (e.g., via wireless or hard-wired means). First electrode array 104 and second electrode array 106 may include any number of sensors as is known, including a voltmeter, etc.

In any event, computing device 910 can comprise any general purpose computing article of manufacture capable of executing computer program code installed by a user (e.g., a personal computer, server, handheld device, etc.). However, it is understood that computing device 910 is only representative of various possible equivalent computing devices and/or technicians that may perform the various process steps of the disclosure. To this extent, in other embodiments, computing device 910 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 910 may be/include a distributed control system.

Figure 9:
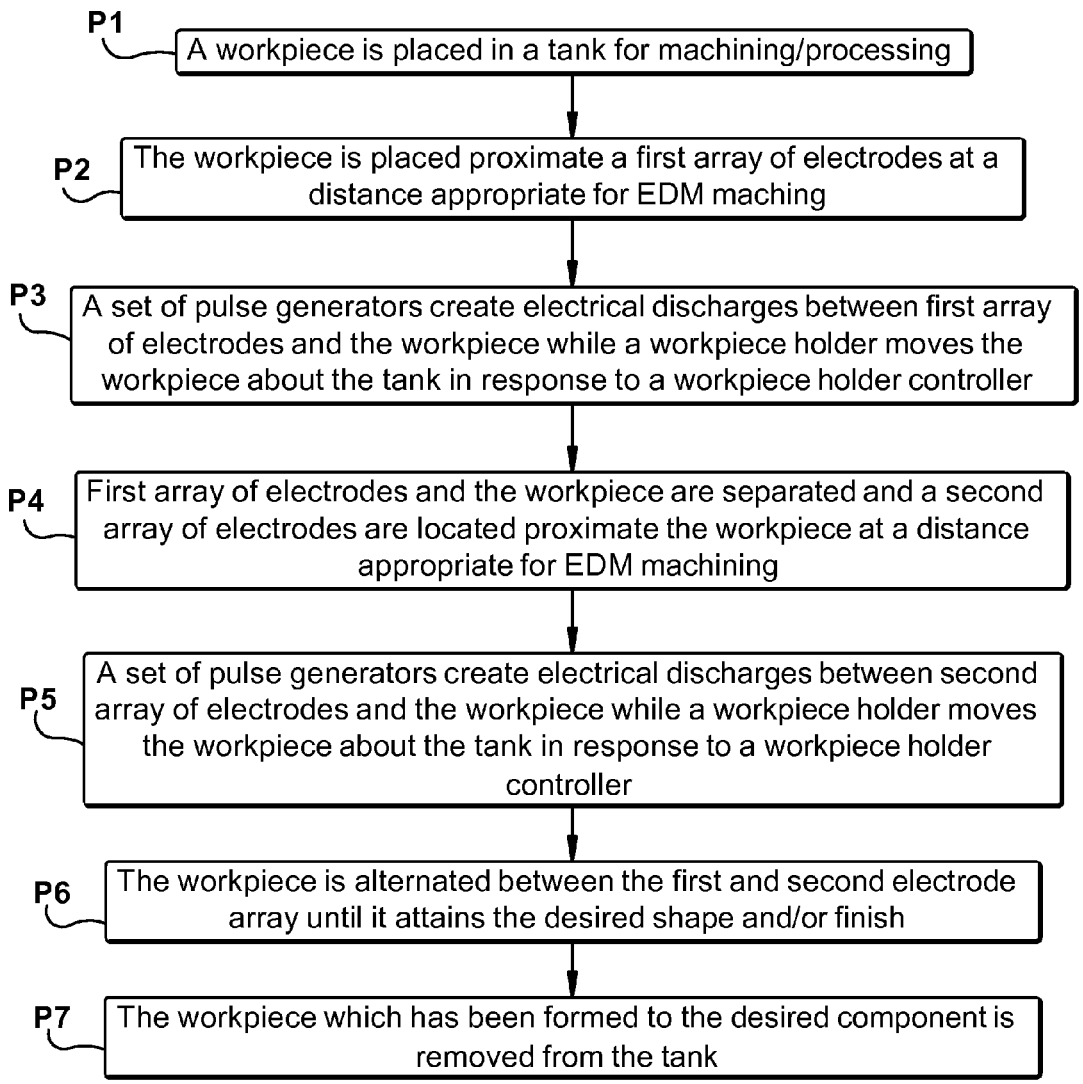
FIG. 9 shows a method flow diagram illustrating a process according to embodiments of the invention.

Turning to FIG. 9, an illustrative method flow diagram is shown according to embodiments of the invention: In process P1, workpiece 102 is placed in tank 110 for machining/processing by EDM device 100. This may include connection to and/or manipulation by a workpiece fixture 90. Following process P1, in process P2, a technician and/or computing device 910 locates workpiece 102 proximate first electrode array 104 at a distance appropriate for EDM machining (e.g., a distance at which each electrode is proximate a surface of the workpiece at a distance which enables safe and efficient electrical discharge and material removal). Following process P2, in process P3, the technician and/or computing device 910 activates a set of pulse generators 606 which create electrical discharges between workpiece 102 and first electrode array 104 for material removal. In one embodiment, workpiece fixture 90 may move/manipulate workpiece 102 during machining based on commands received from workpiece holder controller and/or computing device 910.

In one embodiment, the technician, computing device 910 and/or PU 214 may access any of: a geometric table, a gap sensing circuit communicatively connected to workpiece 102 and first electrode array 104, a voltmeter, a discharge voltage timing mechanism, etc. The technician, computing device 910 and/or PU 214 may compare data obtained from these devices (e.g., the gap sensing circuit) to determine appropriate placement and/or manipulation of workpiece 102, and/or a frequency or voltage of discharge for each electrode in first electrode array 104. Following process P3, in process P4, the technician, computing device 910 and/or PU 214 may separate first electrode array 104 and workpiece 102, and locate workpiece 102 and second electrode array 106 proximate one another at a distance appropriate for EDM machining.

Following process P4, in process P5, the technician, computing device 910 and/or PU 214 activate a set of pulse generators 606 which create electrical discharges between workpiece 102 and second electrode array 106 for material removal. In one embodiment, workpiece fixture 90 may move/manipulate workpiece 102 during machining based on commands received from workpiece holder controller and/or computing device 910.

In one embodiment, the technician, computing device 910 and/or PU 214 may access any of: a geometric table, a gap sensing circuit communicatively connected to workpiece 102 and second electrode array 106, a voltmeter, a discharge voltage timing mechanism, etc. The technician, computing device 910 and/or PU 214 may compare data obtained from these devices (e.g., the gap sensing circuit) to determine appropriate placement and/or manipulation of workpiece 102, and/or a frequency or voltage of discharge for each electrode in second electrode array 106. Following process P5, in process P6, workpiece 102 is alternated between machining in first electrode array 104 and second electrode array 106 until it attains the desired shape and/or finish. Following process P6, in process P7, workpiece 102 is removed from tank 110 once it has attained the desired shape/has become the desired component.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10:
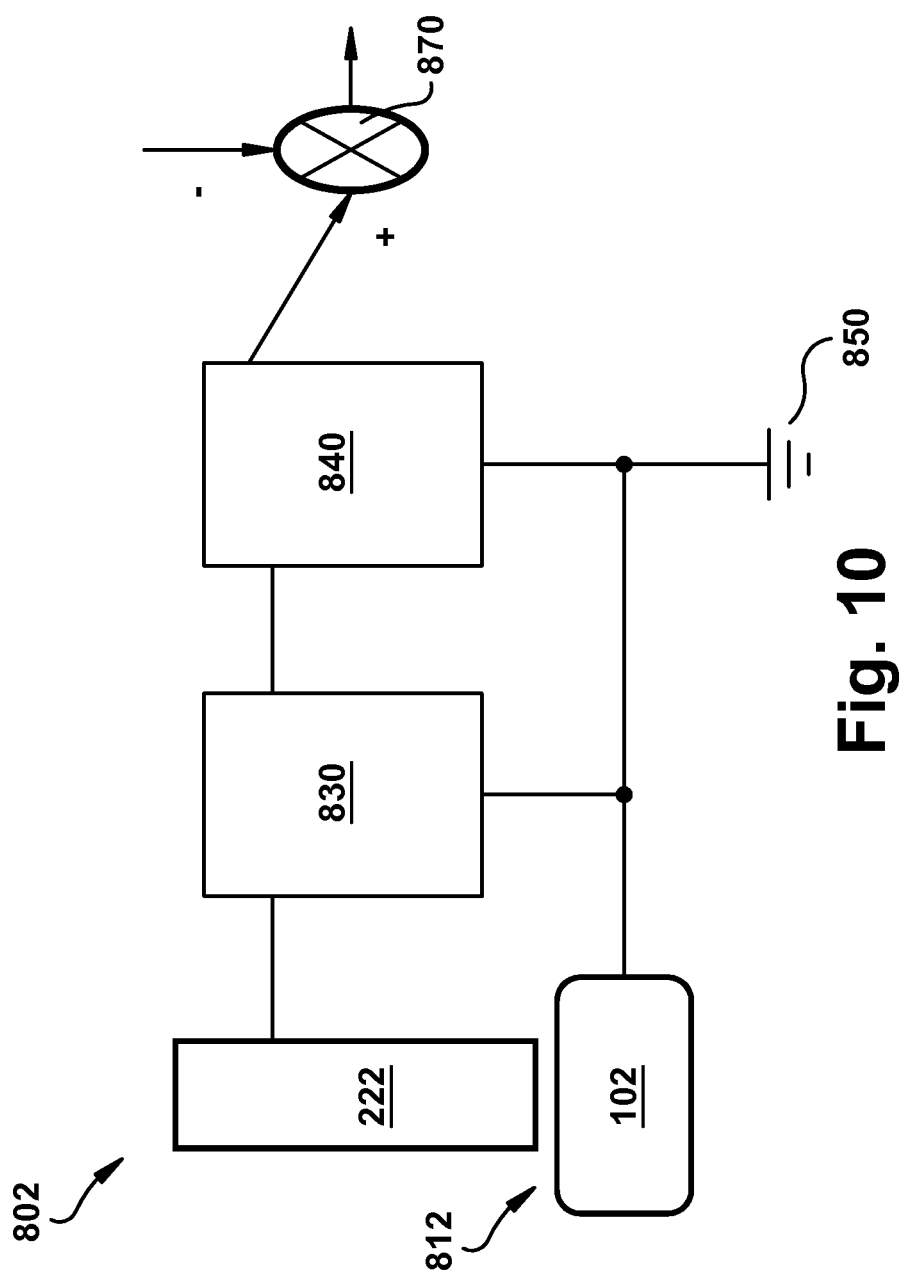
FIG. 10 shows a schematic view of a portion of an EDM die sinking device in accordance with an embodiment of the invention.
Figure 11:
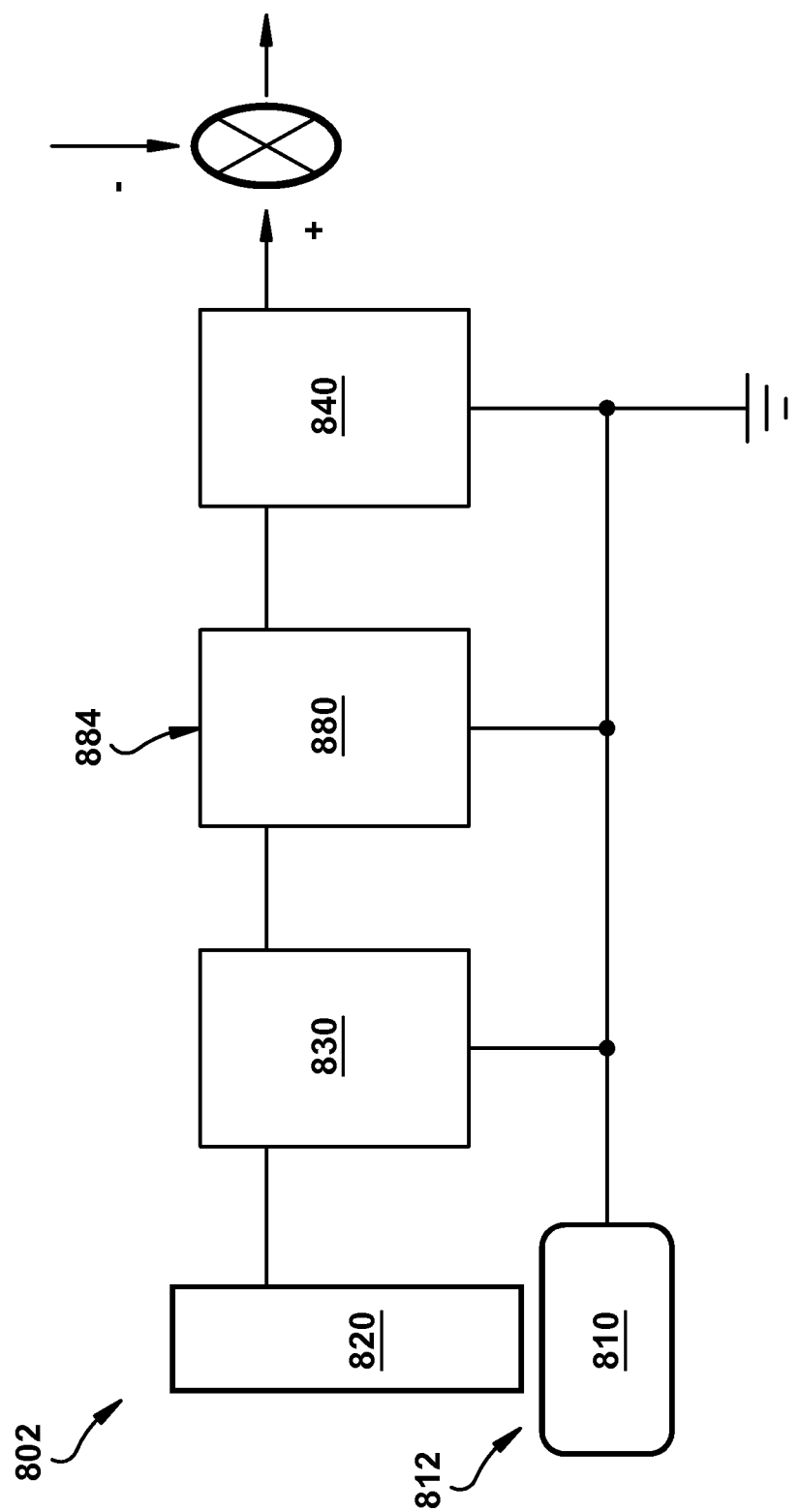
FIG. 11 shows a schematic view of a portion of an EDM die sinking device in accordance with an embodiment of the invention.

Turning to FIG. 10, a portion of EDM device 100 is shown including a gap sensing circuit 802 according to embodiments. Gap sensing circuit 802 may sense voltage discharge peaks and determine how much material is being removed from a single electrode and/or a plurality of electrodes. In one embodiment, gap sensing circuit 802 may consider only time in which EDM device 100 is discharging. In one embodiment, gap sensing circuit 802 may operate based on commands of computing device 910. Gap sensing circuit 802 may sense the space between workpiece 102 and each electrode of first electrode array 104 and/or second electrode array 106. Computing device 910 may be communicatively connected to gap sensing circuit 802 and may process data obtained therefrom to determine activation and use of pulse generators 606 and/or manipulation and/or feeding of workpiece 102.

In an embodiment, shown in FIG. 10, gap sensing circuit 802 may include a voltage divider 830 and a voltage integrator 840 both connected to one another, ground 850, and/or workpiece 102 and an electrode 222. In one embodiment, ground 850 may include a machine tank and/or body. Voltage integrator 840 may further be connected to a reference voltage 870 which may be determined by an operator, computing device 910, etc. Computing device 910 and/or gap sensing circuit 802 may determine a feed control of workpiece 102 based on measurements obtained and compared by voltage divider 830 and voltage integrator 840. In one embodiment, shown in FIG. 11, a sample and hold circuit 880 may be placed between voltage divider 830 and voltage integrator 840. The average gap voltage may be determined via a time integration of gap voltage decreases. However, the average gap voltage may be skewed by continuing to monitor the gap voltage between pulses, this off-time monitoring wrongly sensing the gap between pulses as gap reduction (e.g., instant shorting, instant touching, etc.). Sample and hold circuit 880 decouples the off-time from the gap voltage by triggering computing device 910 and/or gap sensing circuit 802 to ignore any zero gap voltage during off-time. In one embodiment, sample and hold circuit 880 may maintain a gap voltage level equivalent to just before the pulse is turned off. Sample and hold circuit 880 holding the gap voltage to this level until the pulse is turned on in the next cycle. Thus sampling and/or sensing resumes as soon as the voltage pulse is reinitiated/turned back on, and information distortion due to gap signal distortion during off time is eliminated and control performance is improved.

In holding mode, voltage sensing is suspended by holding the voltage signal level once the voltage pulse is turned off for pulse interval or off-time. When the voltage is turned on to start another pulse on-time, the gap sensing circuit 802 is turned back to sample mode from the holding mode in the pulse off-time. In pulse off-time, there is no discharge and gap information because the pulse generator turns the voltage off for dielectric de-ionizing. The gap sensing circuit 802 detects the average gap voltage. The high gap voltage indicates large gap and instructs high feed rate to close the gap. Otherwise the low gap voltage indicates small gap. However long pulse off-time also lowers the gap voltage or average voltage but does not indicate smaller gap size. The effect of pulse off-time on gap voltage is eliminated so that gap voltage depends only on gap size and discharge status but not on pulse off-time. The elimination is done by the sample and hold circuit 880. This is particularly useful for multiple independent pulse generators 660 in which variable off-time can be individually excluded from the gap sensing voltage.

Figure 12:
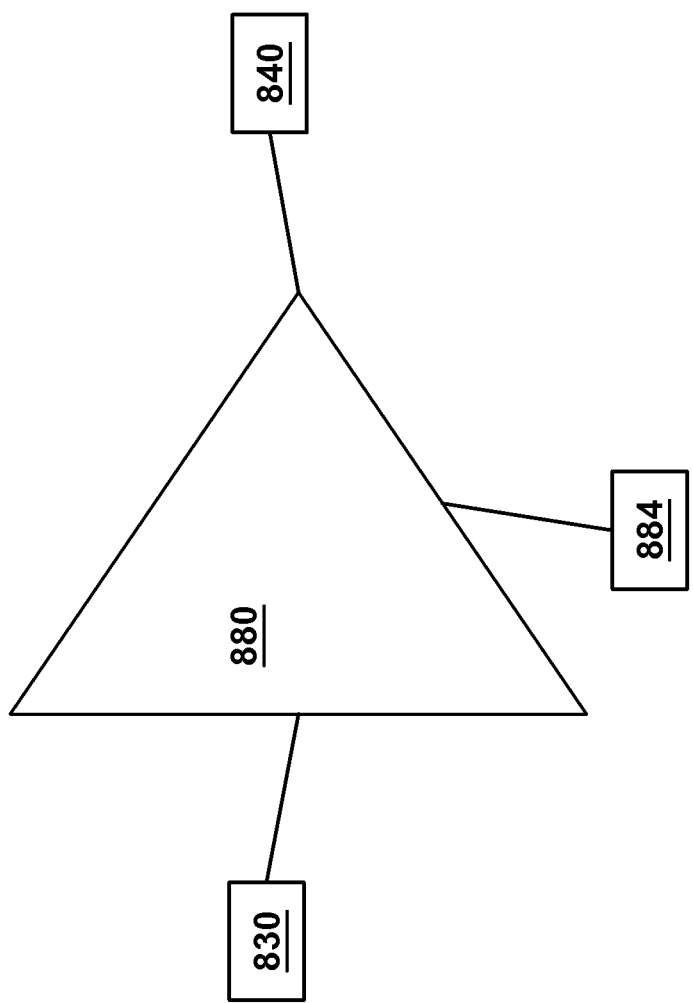
FIG. 12 shows a schematic view of a portion of an EDM die sinking device in accordance with an embodiment of the invention.

In an embodiment, a timing device 884 (e.g., an on-and-off time oscillator, the clock for pulse generator 606) may further be connected to sample and hold circuit 880, thereby enabling sensing and calculating by gap sensing circuit 802 only when the voltage pulse is turned on. This timing device 884 and its subsequent timely measurements decreasing noise and interference in measurements and calculations by reducing sensing during periods in which there is neither a discharge occurring nor gap voltage applied. As shown in FIG. 12, voltage divider 830 may provide analog input to sample and hold circuit 880 which may also receive logic input from timing device 884. Once sample and hold circuit 880 receives and processes these inputs, sample and hold circuit 880 may output data to voltage integrator 840 for further processing (e.g., a determination of average gap voltage) and determining of an appropriate feed rate for workpiece 102.

Figure 13:
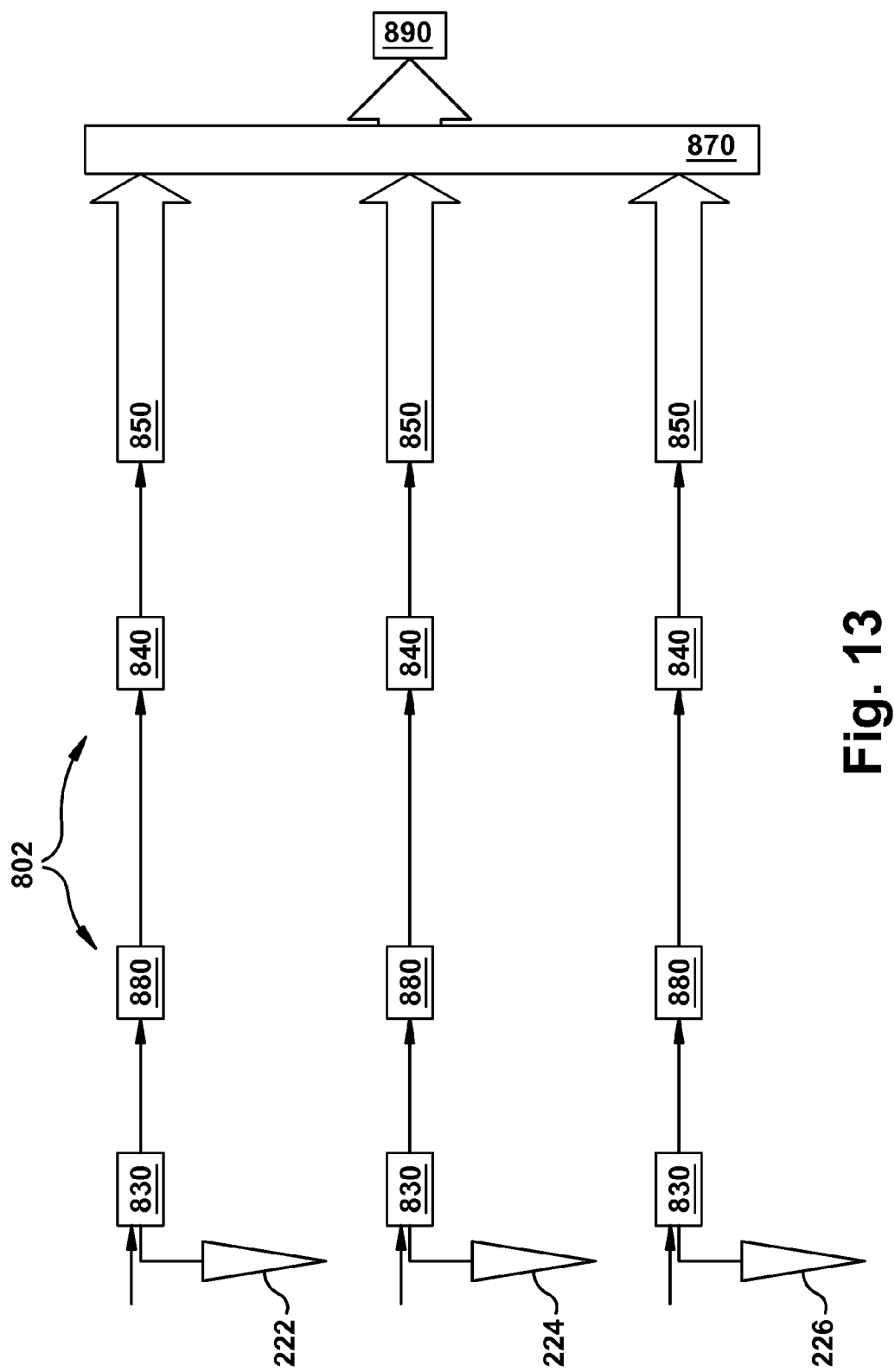
FIG. 13 shows a schematic view of a portion of an EDM die sinking device in accordance with an embodiment of the invention.

Turning to FIG. 13, a portion of EDM device 100 including a plurality of gap sensing circuits 802 is shown according to embodiments. In this embodiment, each electrode 222, 224, 226, etc.) is connected to a gap sensing circuit 802. Plurality of gap sensing circuits 802 are communicatively connected to one another and/or computing device 910 via a set of parallel opto-isolators 850 and a multi-channel signal processor 870. During operation of EDM device 100, each gap sensing circuit 802 may sense/monitor a specific electrode 222, 224, and/or 226, processing the monitoring and relaying results to multi-channel signal processor 870 which compares the data to the general reference voltage to determine a general feed signal 890 for workpiece 102.

The EDM die sinking devices, systems, and methods of the present disclosure are not limited to any one manufacturing system, processing system, or other system, and may be used with other manufacturing systems. Additionally, the system of the present invention may be used with other systems not described herein that may benefit from the control, quality, and efficiency described herein.

As will be appreciated by one skilled in the art, the system described herein may be embodied as a system(s), method(s), operator display (s) or computer program product(s), e.g., as part of a power plant system, a power generation system, a turbine system, etc. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As discussed herein, various systems and components are described as "obtaining" and/or "transferring" data (e.g., operational data, component temperatures, system specifications, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric discharge machining (EDM) die sinking device comprising:
    a tank for holding a fluid;
    a first electrode array in the tank, the first electrode array including a plurality of electrode segments, each of the plurality of segments being electrically insulated from other electrode segments of the plurality of electrode segments, wherein the plurality of electrode segments are configured to shape a workpiece;
    a workpiece fixture for positioning the workpiece at least partially immersed in the fluid and proximate the first electrode array;
    a pulse generator for creating an electric discharge between the workpiece and the first electrode array to remove material from the workpiece;
    a gap sensing circuit communicatively connected to the workpiece and the first electrode array, the gap sensing circuit configured to monitor the electric discharge between the workpiece and the first electrode array; and
    a computing device communicatively connected to the gap sensing circuit and the workpiece fixture, for communication, the computing device manipulating a position of the workpiece in the tank relative the first electrode array based upon data obtained from the gap sensing circuit.

2. The EDM die sinking device of claim 1, further comprising:
    a second electrode array in the tank, the second electrode array having a second shape complementary to a first shape of the first electrode array for imparting a designed shape to the workpiece, and
    wherein the computing device alternately moves the workpiece between the first electrode array and the second electrode array via the workpiece fixture.

3. The EDM die sinking device of claim 2, wherein interchanging of the first electrode array and the second electrode array flushes debris proximate the workpiece.

4. The EDM die sinking device of claim 1, wherein the computing device controls an inter-electrode gap between the workpiece and the first electrode array based on at least one of: a first spark, a shortest distance between an electrode and the workpiece, and an averaged voltage calculation excluding off-time.

5. The EDM die sinking device of claim 1, wherein each electrode in the first electrode array has a substantially linear surface which is exposed to the workpiece.

6. The EDM die sinking device of claim 1, wherein the pulse generator causes the first electrode array to have a positive polarity and the workpiece to have a negative polarity.

7. The EDM die sinking device of claim 1, wherein the gap sensing circuit includes a plurality of gap sensing circuits, each gap sensing circuit electrically connected to an electrode of the first electrode array, for communication.

8. The EDM die sinking device of claim 1, wherein the gap sensing circuit includes a timing device, the timing device configured to determine when a discharge is occurring between the first electrode array and the workpiece.

9. The EDM die sinking device of claim 8, wherein the gap sensing circuit is configured to monitor the inter-electrode gap only during discharge between the first electrode array and the workpiece.

10. An electric discharge machining (EDM) die sinking device comprising:
    a first electrode array including a plurality of electrode segments, each of the plurality of electrode segments being electrically insulated from other electrode segments of the plurality of electrode segments, the first electrode array including a first shape for imparting to a workpiece;

a separate electric pulse generator coupled to each electrode segment of the first electrode array;

a pulse controller coupled to each separate electric pulse generator for generating an electric discharge on each electrode segment independently of other electrode segments to remove material from the workpiece; and a gap sensing circuit communicatively connected to the first electrode array, for communication, and configured to monitor an inter-electrode gap between the first electrode array and the workpiece.

11. The EDM die sinking device of claim 10, further comprising a computing device communicatively connected to the gap sensing circuit, for communication, the computing device configured to manipulate a position of the workpiece relative the first electrode array based upon data obtained from the gap sensing circuit.

12. The EDM die sinking device of claim 11, further comprising:

a second electrode array having a second shape complementary to a first shape of the first electrode array for imparting to a designed shape to the workpiece, and wherein the computing device is configured to alternately move the workpiece between the first electrode array and the second electrode array via a workpiece fixture.

13. The EDM die sinking device of claim 11, wherein the computing device controls an inter-electrode gap between the workpiece and the first electrode array based on at least one of: a first spark, an electrode which generates the most pulses with a discharge or a shorting current, a shortest distance between an electrode and the workpiece, and an averaged voltage calculation excluding pulse off-time.

14. The EDM die sinking device of claim 10, wherein each electrode in the first electrode array has a substantially linear surface which is exposed to the workpiece.

15. The EDM die sinking device of claim 10, wherein the gap sensing circuit includes a plurality of gap sensing circuits, each gap sensing circuit electrically connected to a distinct electrode segment in the first electrode array, for communication.

16. The EDM die sinking device of claim 10, wherein the gap sensing circuit includes a timing device, the timing device configured to determine when a discharge is occurring between the first electrode array and the workpiece.

17. The EDM die sinking device of claim 16, wherein the gap sensing circuit is configured to monitor the inter-electrode gap only during discharge between the first electrode array and the workpiece.

* * * * *